United States Patent
Zavesky et al.

(10) Patent No.: US 11,157,524 B2
(45) Date of Patent: Oct. 26, 2021

(54) AUTOMATED LEARNING OF ANOMALIES IN MEDIA STREAMS WITH EXTERNAL FEED LABELS

(71) Applicant: AT&T Intellectual Property I, L.P., Atlanta, GA (US)

(72) Inventors: Eric Zavesky, Austin, TX (US); Lee Begeja, Gillette, NJ (US); Raghuraman Gopalan, Dublin, CA (US); Bernard S. Renger, New Providence, NJ (US); Behzad Shahraray, Holmdel, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 746 days.

(21) Appl. No.: 15/984,052

(22) Filed: May 18, 2018

(65) Prior Publication Data

US 2019/0354629 A1 Nov. 21, 2019

(51) Int. Cl.
*G06F 16/28* (2019.01)
*G06N 3/08* (2006.01)
*G06F 16/2457* (2019.01)

(52) U.S. Cl.
CPC ...... *G06F 16/285* (2019.01); *G06F 16/24575* (2019.01); *G06N 3/08* (2013.01)

(58) Field of Classification Search
CPC .......... G06F 16/08; G06F 16/285; G06N 3/08
See application file for complete search history.

(56) References Cited

U.S. PATENT DOCUMENTS

| 7,084,775 B1* | 8/2006 | Smith ................. H04L 67/18 340/601 |
| 8,411,935 B2 | 4/2013 | Eaton et al. |
| 8,457,612 B1* | 6/2013 | Daniell ................. H04W 4/14 455/414.4 |
| 8,611,677 B2 | 12/2013 | Das et al. |
| 8,649,594 B1 | 2/2014 | Hua et al. |
| 8,760,290 B2 | 6/2014 | Piett et al. |
| 9,043,329 B1* | 5/2015 | Patton ................ G06F 16/951 707/740 |
| 9,251,421 B2 | 2/2016 | Tu et al. |
| 9,384,400 B2 | 7/2016 | Mate et al. |
| 9,418,705 B2 | 8/2016 | Kaps et al. |
| 9,420,237 B2 | 8/2016 | Dong et al. |

(Continued)

*Primary Examiner* — Robert W Beausoliel, Jr.
*Assistant Examiner* — Susan F Rayyan

(57) ABSTRACT

Methods, computer-readable media, and devices are disclosed for providing a notification of an anomaly in a media content that is associated with an event type. For example, a method may include a processing system including at least one processor for detecting a first anomaly from a first media content, generating a first anomaly signature for the first anomaly, obtaining a notification of a first event, the notification including an event type, time information, and location information of the first event, correlating the first anomaly to the notification of the first event, and labeling the first anomaly signature with the event type. The processing system may further detect a second anomaly from a second media content that matches the first anomaly signature and transmit a notification of a second event of the event type when it is detected that the second anomaly matches the first anomaly signature.

20 Claims, 3 Drawing Sheets

(56) References Cited

U.S. PATENT DOCUMENTS

| | | | |
|---|---|---|---|
| 9,536,308 B2 | 1/2017 | Ostrovsky-Berman et al. | |
| 9,740,940 B2 | 8/2017 | Chattopadhyay et al. | |
| 9,811,989 B2 | 11/2017 | Austin | |
| 9,911,044 B2 | 3/2018 | Ostrovsky-Berman et al. | |
| 9,940,508 B2 | 4/2018 | Kaps et al. | |
| 9,965,683 B2 | 5/2018 | Verdejo et al. | |
| 10,129,118 B1 * | 11/2018 | Ghare | H04L 43/028 |
| 10,560,465 B2 * | 2/2020 | Ghare | H04L 63/1425 |
| 10,678,815 B2 * | 6/2020 | Patton | G06F 16/29 |
| 10,861,320 B2 * | 12/2020 | Martin | G08B 31/00 |
| 2007/0260581 A1 * | 11/2007 | Hiller | H04L 12/1868 |
| 2009/0193293 A1 * | 7/2009 | Stolfo | H04L 63/1416 |
| | | | 714/26 |
| 2013/0027561 A1 | 1/2013 | Lee et al. | |
| 2013/0036440 A1 * | 2/2013 | Eyer | H04H 20/59 |
| | | | 725/40 |
| 2014/0109223 A1 * | 4/2014 | Jin | H04L 63/1408 |
| | | | 726/23 |
| 2014/0327547 A1 * | 11/2014 | Johnson | G08B 21/18 |
| | | | 340/601 |
| 2014/0328570 A1 | 11/2014 | Cheng et al. | |
| 2015/0256277 A1 * | 9/2015 | Johnson | H04L 67/26 |
| | | | 340/601 |
| 2016/0292881 A1 * | 10/2016 | Bose | H04N 7/181 |
| 2016/0314354 A1 | 10/2016 | Teuton et al. | |
| 2016/0350597 A1 | 12/2016 | Bataller et al. | |
| 2017/0104775 A1 * | 4/2017 | Vasseur | H04L 41/145 |
| 2017/0353477 A1 * | 12/2017 | Faigon | G06F 21/6209 |
| 2018/0032845 A1 | 2/2018 | Polak et al. | |
| 2018/0157939 A1 * | 6/2018 | Butt | H04N 21/44 |
| 2019/0042867 A1 * | 2/2019 | Chen | G06K 9/46 |
| 2019/0171885 A1 * | 6/2019 | Chau | G06K 9/00771 |

\* cited by examiner

AUTOMATED LEARNING OF ANOMALIES IN MEDIA STREAMS WITH EXTERNAL FEED LABELS

The present disclosure relates generally to emergency alert networks, and more particularly to devices, computer-readable media, and methods for providing a notification of an anomaly in a media content that is associated with an event type.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
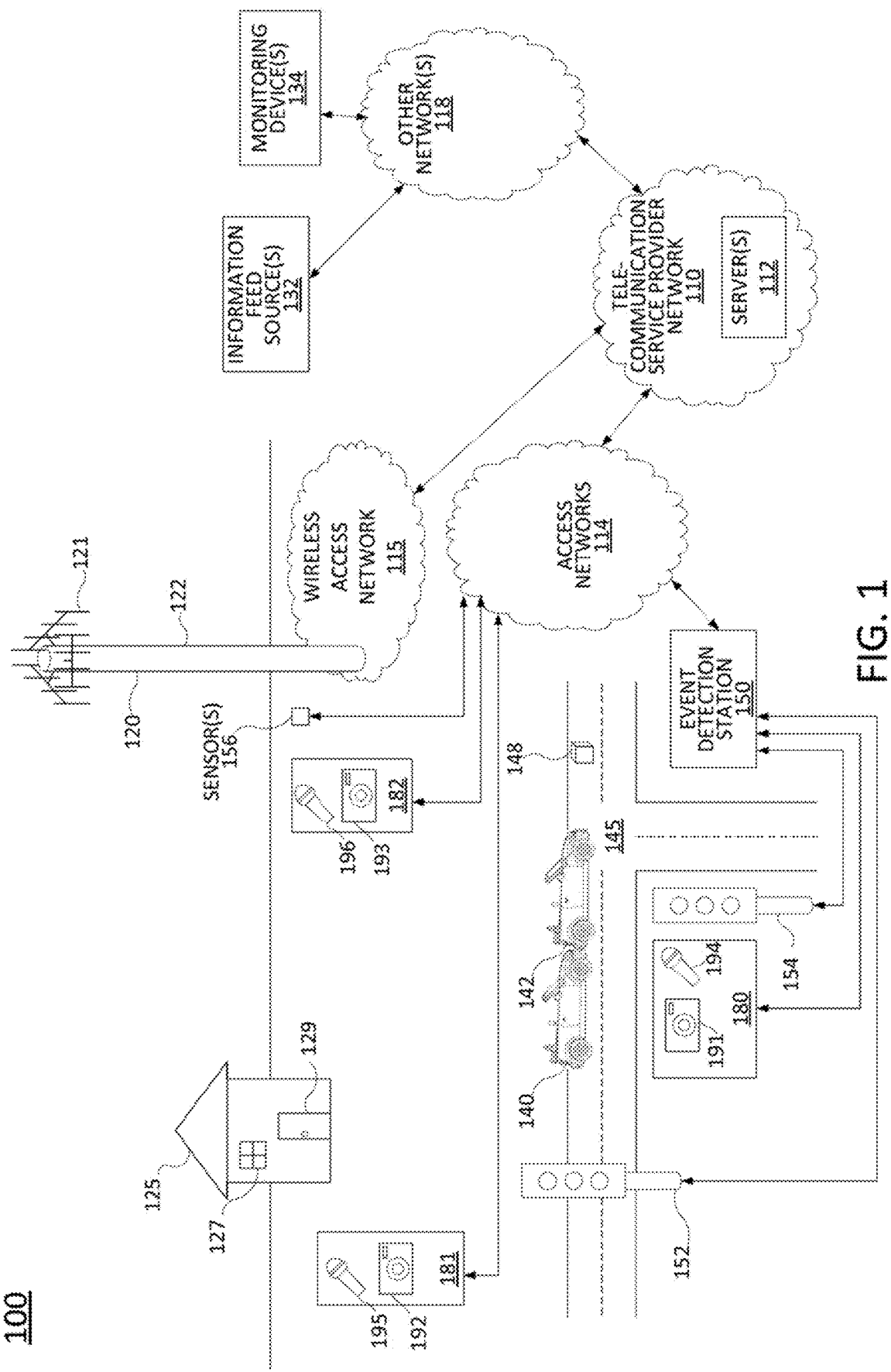
FIG. 1 illustrates an example system related to the present disclosure.

In one example, the present disclosure discloses a method, computer-readable medium, and device for providing a notification of an anomaly in a media content that is associated with an event type. For example, a method may include a processing system including at least one processor detecting a first anomaly from a first media content, generating a first anomaly signature for the first anomaly, obtaining a notification of a first event, the notification including an event type, time information, and location information of the first event, correlating the first anomaly to the notification of the first event, and labeling the first anomaly signature with the event type. The processing system may further detect a second anomaly from a second media content that matches the first anomaly signature and transmit a notification of a second event of the event type when it is detected that the second anomaly matches the first anomaly signature.

Examples of the present disclosure provide a system for automated identification of anomalies in media content and labeling of anomalies as new semantic events or insights (e.g., a traffic jam, people entering a store, etc.). In particular, examples of the present disclosure utilize digitized reports, e.g., a Short Message Service (SMS)/text message-based alert, a Really Simple Syndication (RSS) feed-based alert, an email-based alert, a radio broadcast alert, a television broadcast alert, and so forth. The report may be disseminated by a weather alert service (e.g., the National Weather Service (NWS), a state or local weather alert service, or an independent weather news source), a traffic alert service (e.g., from a state department of transportation (DOT) or independent traffic news source), a public safety alert service (e.g., from a local governmental authority such as a fire department, a police department, an emergency medical services (EMS) department, a hazardous materials department (hazmat), etc.), an aggregator alert service, and so on. Examples of the present disclosure may be applied to macro-level problems (e.g., flooding, evacuation needs, etc.) as well as micro-level problems, such as a retail store being under-staffed. In particular, events of interest can be observed as anomalies in media sources and identified as particular events through correlation with external data feeds. Future events of a same event type may then be predicted through machine learning models trained in accordance with the present disclosure.

In one example, anomalies are detected by unsupervised historical linkage and observation, and then labeled with external semantic tags derived from external data sources. It should be noted that examples of the present disclosure relate to various types of media content including video, still images, and audio. To illustrate, a camera may be directed at a roadway and capture video of an accident. In addition, the accident may be identified as an anomaly in the video (e.g., two cars unusually close together and/or stopped, where vehicles are usually in motion). The anomaly, e.g., "unusual" features in the video stream, may be determined via a comparison of features from one or more frames in a given time window versus "normal" or average features from a larger time period. The features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. In one example, the system may perform image salience detection processes, e.g., applying an image salience model and then performing an image recognition algorithm over the "salient" portion of the image(s). Thus, in one example, visual features may also include a recognized object, a length to width ratio of an object, a velocity of an object estimated from a sequence of images (e.g., video frames), and so forth.

Features used to determine if a given portion of the video stream include an anomaly may also include low-level audio features such as: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth. Additional audio features may also include high-level features, such as: words and phrases. For instance, one example may utilize speech recognition pre-processing to obtain an audio transcript and to rely upon various keywords or phrases as data points.

In the present example, there may also be a report of the accident that is contained in a traffic report feed that gives a time and a location, and this may then be correlated with the anomaly determined to be present in the video feed. For instance, the traffic report feed may include the text: "accident on I-98 mile marker 82 reported at 11:15 am." The feed thus includes a location, "I-98 mile marker 82," and a time, "11:15 am." The report may also include the date of the accident, e.g., Jan. 1, 2018 and so on. The system may comprise a database or may access a database that may be used to determine that the location in the traffic report feed is relevant to the location of the camera. The relevance of the location may be determined in any number of ways. For instance, the location may be relevant if it is determined to be within a threshold distance from the location of the camera, if it is within a same town or zip code, if it is within a given geofence surrounding the location of the camera, if it pertains to a same roadway or segment of a roadway as the camera, if it pertains to a same building and/or a same room as the camera, and so forth.

The system may then review the media content for a designated time prior to and including the time provided in the report (e.g., from 30 minutes prior to 11:15 am until 11:15 am, from 15 minutes prior to 11:15 am until 11:15 am, etc.) to determine if there is an anomaly in the media content. When there is an anomaly present in the media content, the features may be stored as an "anomaly signature." In one example, the traffic report description of the incident then becomes the label, or event type, for the anomaly signature; in this case, "accident." In one example, an anomaly signature may be created that represents multiple anomalies having a threshold similarity. For instance, the anomaly signature may comprise a machine learning model (MLM) that is trained based upon the plurality of features from the plurality of anomalies. For instance, each of the similar anomalies may comprise a positive example that is applied to a machine learning algorithm (MLA) to generate the anomaly signature (e.g., a MLM). In one example, the anomalies used to train the MLM may be determined to be "similar" when the anomalies are associated with the same or similar events from one or more external data feeds. For instance, when a plurality of anomalies are all determined to be associated with "accidents" based upon one or more traffic report data feeds, the features of the plurality of anomalies may then be used to create an aggregate anomaly signature for the sematic concept of "accident." In another example, the MLM may comprise the average features representing a cluster of the plurality of similar anomalies in a feature space.

The machine learning algorithm (MLA), or machine learning model (MLM) trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, the anomaly signature may include those features which are determined to be the most distinguishing features of the anomaly, e.g., those features which are quantitatively the most different from what is considered statistically normal or average from a source of the media content, e.g., the top 20 features, the top 50 features, etc.

In one example, the anomaly signature (e.g., a MLM) may be deployed as a network filter to process media content from the same and/or additional media sources to identify patterns in the features of the media content(s) that match the anomaly signature. In one example, a match may be determined using any of the visual features and/or audio features mentioned above. For instance, a match may be determined when there is threshold measure of similarity among the features of the media source(s) and the anomaly signature. In one example, the media source(s) may be analyzed using a time-based sliding window, extracting features, and comparing the features to the anomaly signature. Thus, the next time there is a similar sequence of events, e.g., similar imagery and/or audio, it may be associated with the earlier event and may be identified as a potential other event of the same event type.

In one example, a notification of a potential new event of the same event type may be provided to one or more appropriate recipients. For instance, for a potential road accident, police, EMS, DOT, and other governmental or private entities may be automatically provided within notification of the potential new event. The notification may include the event type (e.g., "accident"), a time, and a location. For instance, a camera capturing the new event may have a location provided in metadata of the video stream or may have a known location that is stored in a database accessible to the system. Similarly, the video stream may include time stamp information for frames of the video. Thus, the system may determine the relevant time of the event. In one example, the notification may further include a percentage prediction error or confidence score. For instance, a confidence score may be proportional to the quantitative similarity between the detected anomaly and the anomaly signature.

In one example, the notification may also include a portion of the media content, e.g., a short clip of video, a series of one or more still images, or the like. Accordingly, the one or more recipients of the notification may inspect the portion of the media content to determine if the potential new event has been accurately detected and notified. In one example, notifications can be used to manage multiple media sources by providing a monitoring station with feeds from media sources with anomalies currently matching anomaly signatures, and suppressing feeds from other available media sources. In one example, the one or more recipients may provide a response indicating whether the notification was accurate. The response may be used to further refine the anomaly signature. For instance, the features of the second anomaly may be used as a positive training example for the anomaly signature when the feedback is a positive feedback. Conversely, the features of the second anomaly may be used as a negative training example for the anomaly signature when the feedback is a negative feedback. In another example, if there is an anomaly detected that matches an anomaly signature, but it is later found that there is no corresponding event for the anomaly via a secondary source (data feed), it may be considered a false positive. For instance, this aspect may be utilized where no affirmative feedback regarding a notification is provided to the system by a recipient. In one example, the notification may also include an automated message presented visually on a sign of a building, roadway or the like, and/or presented in an audio format, e.g., a recording played via one or more speakers deployed in an environment, via one or more mobile phone speakers, etc. In one example, the notification may also include changing a signal in an environment (e.g., a traffic signal), closing or opening an automated door, window, or other barrier, and so forth.

In one example, an event may also be correlated to possible additional visual anomalies that may be associated with the same event. For instance, a visual anomaly of an accident may be correlated to a report of the accident from a traffic report data feed. However, if media content from the media source is inspected further back in time, e.g., 5 minutes prior, 2 minutes prior, etc., there may also be another anomaly (e.g., a premeditating event that may have caused the accident) that may be detected. For instance, there may be a visual anomaly of an obstruction or debris (e.g., a large package or object, a flat tire, and so on) on a roadway in a video stream in addition to a visual anomaly of the subsequent accident several minutes later. In such case, by extending a search window further back in time from the time of the event indicated in the traffic report data feed, the earlier anomaly may also be found and correlated to the event. In addition, the two anomalies may also be correlated/associated with each other. For instance, without having specific knowledge of causation, the fact that the two anomalies appeared in the same media content close in time to each other, and at or close to the time of the event contained in the traffic report data feed, the earlier anomaly may be considered as a causal event for the later event that is actually reported.

In one example, an additional anomaly signature may be generated for the earlier visual anomaly that is considered to be the causal event. In addition, the additional anomaly signature may be deployed as a network filter to process media content from the same and/or additional media sources to identify patterns in the features of the media content(s) that match the additional anomaly signature. In one example, the additional anomaly signature may be labeled with the same event type as the later visual anomaly along with metadata indicating that the additional anomaly signature is a possible causal event related to a subsequent event of the indicated event type. Thus, the label may be "accident" since that is what is reported in the traffic/news feed, rather than a label of "obstruction on road," but it will still be useful to provide relevant information to a decision maker, e.g., next time when an errand tire is detected on the road, it can be properly detected as a known anomaly and then promptly reported, thereby potentially averting a subsequent accident as a result. For example, a notification in the roadway via a display can flash a warning such as "Caution!—debris detected ahead in the roadway" and so on. In addition, although an obstruction on a road is not always a prior condition for an accident, in instances where there is such a correlation, it is something that may be indicated by a visual anomaly that may be detected, learned, and notified in accordance with the present disclosure. Examples of the present disclosure may relate to various types of events that may be detected as anomalies in media sources, such as a car crash, a flood portion of a road or property, a power outage, etc., which can all be correlated to various external data feeds relating to traffic, weather, law enforcement, public safety, and so forth.

As just one additional example, a camera may be trained on a wall of a basement and detect an anomaly of basement flooding. In addition, a later building maintenance report may include a basement flooding remediation work order noting a time. The location may also be noted in the work order, or implied if the system is only deployed with respect to a single building. The report of "basement flooding" may then be correlated to the anomaly that is detected in a video feed or series of still images from the camera. In addition, an anomaly signature for "basement flooding" may be created and labeled, and then used to detect and notify of a subsequent flooding event that has now been learned.

It should be noted that examples of the present disclosure may incorporate media content from multiple sources to increase the accuracy of the detection and classification of anomalies. For instance, multiple cameras directed at a same location from different angles may provide media content that can be used to detect a same anomaly/same event. In addition, the anomalies detected from the multiple media sources may be used to verify the accuracy of detection of an anomaly from the other media sources. In addition, in one example, the present disclosure may provide recommended remedies based on the difference between anomalies and regular events in similar contextual conditions. For instance, multiple video feeds from nearby cameras may include a forest of conifer trees failing during bad weather while showing one or several ginkgo trees surviving. The system may thus suggest planting more ginkgo trees in the affected areas. Examples of the present disclosure therefore improve public safety and efficiency for automated insights through correlated media content and semantic data content. In addition, examples of the present disclosure provide semantic labeling of anomalies based on locally observed conditions. For instance, some areas may be flooded, but an anomaly detected in one region may be "normal" and therefore dismissible in another region. Examples of the present disclosure may also be used to increase accuracy of predictions from traditional sources (e.g., for weather, traffic, expected crowd capacity, etc.) using combined media content and external data feed information, to promote faster repairs (e.g., locating the cause of anomaly), and so forth. These and other aspects of the present disclosure are discussed in greater detail below in connection with the examples of FIGS. 1-3.

To aid in understanding the present disclosure, FIG. 1 illustrates a block diagram depicting one example of an environment 100 suitable for performing or enabling the steps, functions, operations, and/or features described herein. As illustrated in FIG. 1, the environment 100 includes a telecommunication service provider network 110. In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

The telecommunication service provider network 110 may be in communication with one or more access networks. For instance, wireless access network 115 may comprise a cellular network (e.g., a Universal Mobile Telecommunications System (UMTS) terrestrial radio access network (UTRAN), an evolved UTRAN (eUTRAN), a base station subsystem (BSS), e.g., a Global System for Mobile communication (GSM) radio access network (GRAN), a 2G, 3G, 4G and/or 5G network, a Long Term Evolution (LTE) network, and the like). In such examples, telecommunication service provider network 110 may include evolved packet core (EPC) network components, network switching subsystem (NSS)/GSM core network and/or General Packet Radio Service (GPRS) core network components, and so forth. Thus, in one example, wireless access network 115 may include at least one cell tower 120, which may alternatively comprise a cellular base station, such as a base transceiver station (BTS), a NodeB, an evolved NodeB (eNodeB), and the like, a non-cellular wireless access point, and so forth. Cell tower 120 may include antenna arrays 121 (e.g., remote radio heads (RRHs)), a mast 122, and other components (not shown). The telecommunication service provider network 110 and the wireless access network 115 may be operated by different service providers, or by a same service provider.

In one example, telecommunication service provider network 110 is connected to other networks 118. In one example, other networks 118 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 118 may include different types of networks. In another example, the other networks 118 may be the same type of network. In one example, the other networks 118 may represent the Internet in general.

In one example, telecommunication service provider network 110 is also connected to access networks 114. The access networks 114 may include a wireless access network (e.g., an IEEE 802.11/Wi-Fi network and the like), a Wide Area Network (WAN), a cellular access network, such as an evolved Universal Terrestrial Radio Access Network (eU-TRAN) that includes one or more eNodeBs, a PSTN access network, a cable access network, a digital subscriber line (DSL) network, a metropolitan area network (MAN), other types of wired access networks, an Internet service provider (ISP) network, and the like. Alternatively, or in addition, access networks 114 may represent corporate, governmental or educational institution LANs, a home/residential LAN, and the like. In one embodiment, the access networks 114 may all be different types of access networks, may all be the same type of access network, or some access networks may be the same type of access network and other may be different types of access networks. The other networks 118, the access networks 114, wireless access network 115, and the telecommunication service provider network 110 may be operated by different service providers, the same service provider, or a combination thereof. The other networks 118, the access networks 114, wireless access network 115, and the telecommunication service provider network 110 may be interconnected via one or more intermediary networks (not shown) which may utilize various different protocols and technologies for transporting communications in the form of data packets, datagrams, protocol data units (PDUs), and the like, such as one or more IP/MPLS networks, one or more frame relay networks, one or more ATM networks, and so forth.

Figure 3:
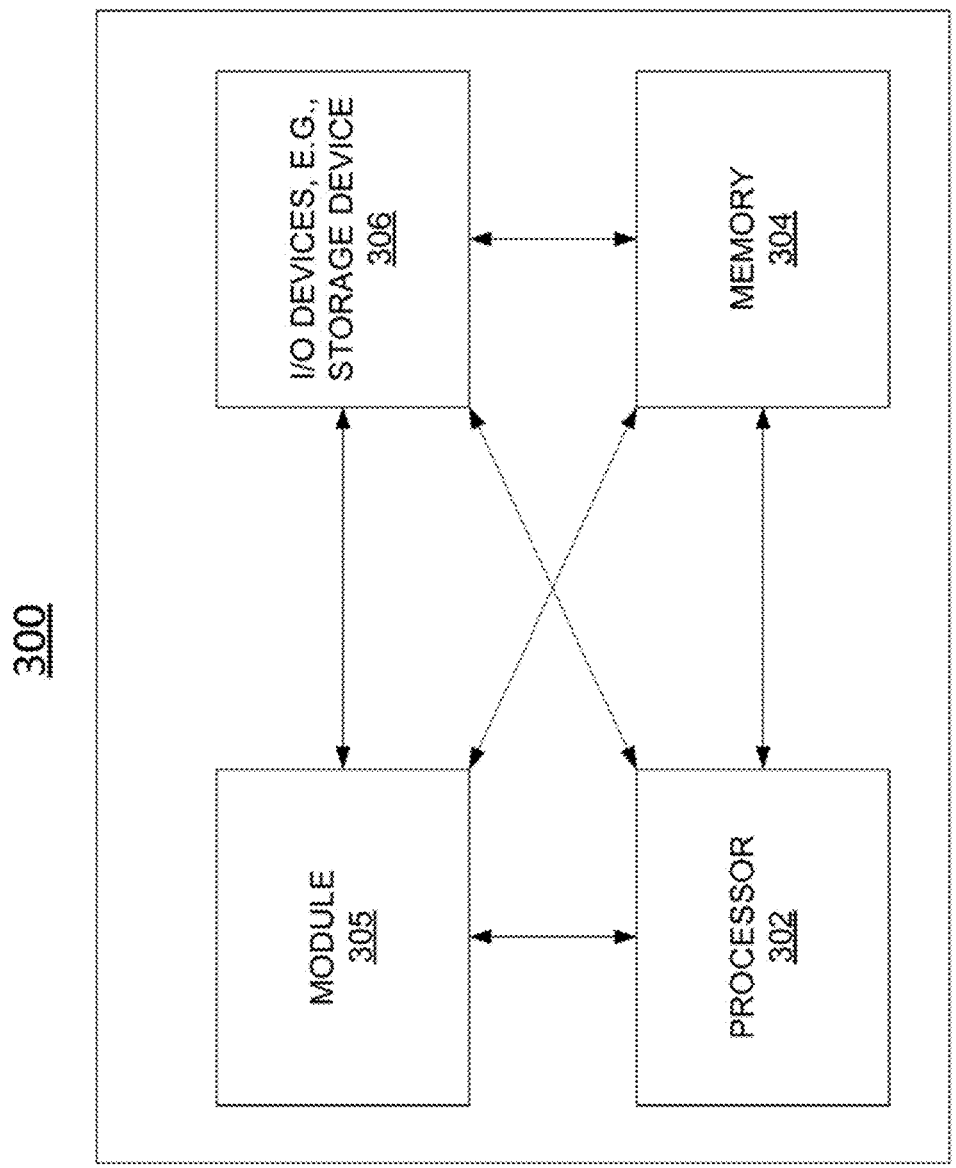
FIG. 3 illustrates an example high-level block diagram of a computing device specifically programmed to perform the steps, functions, blocks, and/or operations described herein.

The example of FIG. 1 further includes several media sources 180-182 which may include cameras 191-193 (e.g., video cameras, cameras to capture sequences of still images, etc.) and microphones 194-196. The media sources 180-182 may generate streams of media content comprising still images, audio, and/or video. Further illustrated in FIG. 1 is an event detection station 150 which may comprise all or a portion of a computing device or system, such as computing system 300, and/or processing system 302 as described in connection with FIG. 3 below, and may be configured to perform various steps, functions, and/or operations in connection with examples of the present disclosure for providing a notification of an anomaly in a media content that is associated with an event type. It should be noted that the terms "configure" and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Figure 2:
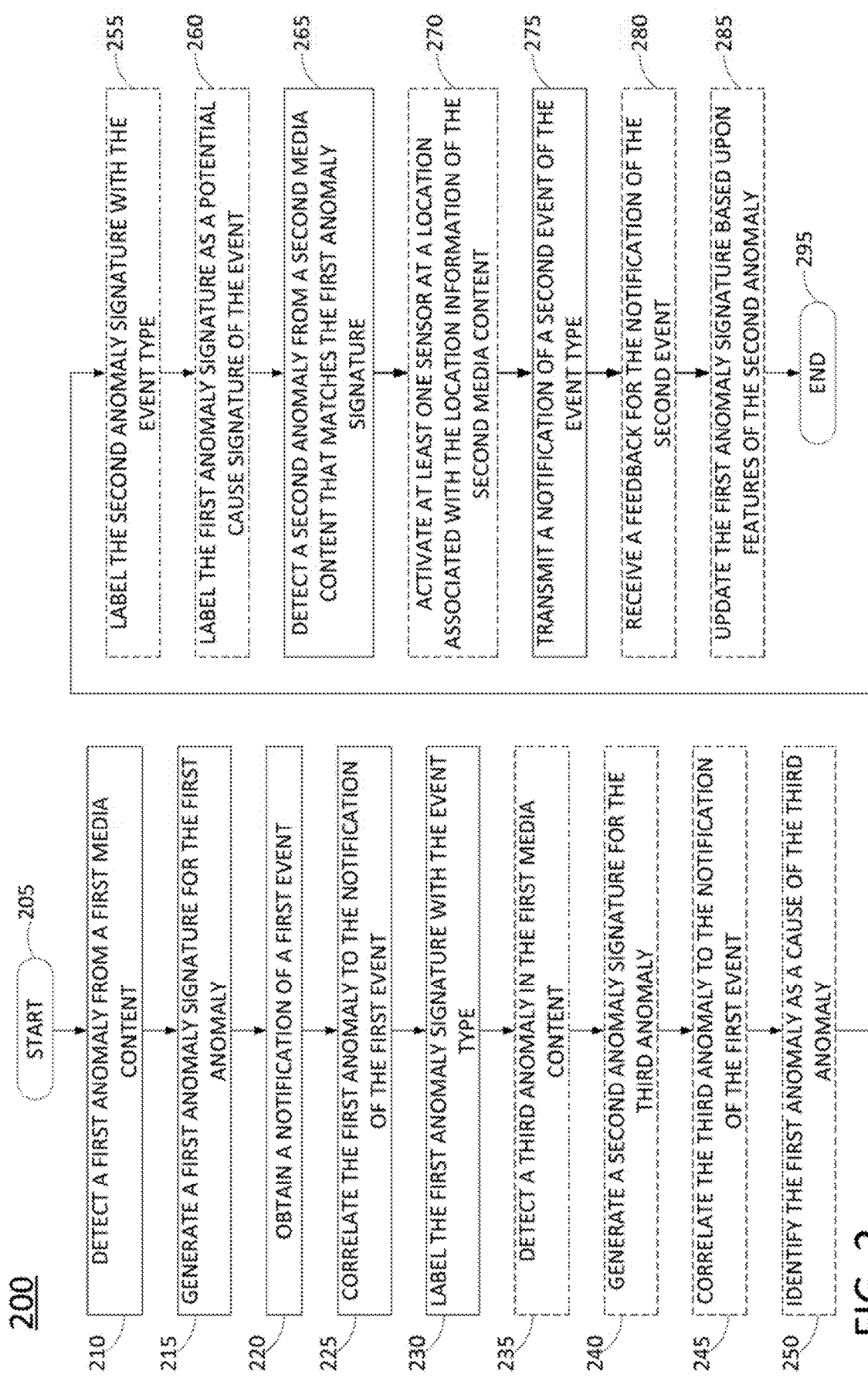
FIG. 2 illustrates a flowchart of an example method for providing a notification of an anomaly in a media content that is associated with an event type, in accordance with the present disclosure.

In one example, the event detection station 150 may collect and process media content from one or more of the media sources 180-182. In the present example, monitoring station 150 may be connected to media source 180, or may obtain media content from media sources 181 and/or media source 182 via one or more of the access networks 114. In particular, media sources 180-182 may provide media content that may be used by event detection station 150 to perform operations for providing a notification of an anomaly in a media content that is associated with an event type, in accordance with the present disclosure. An example method for providing a notification of an anomaly in a media content that is associated with an event type is illustrated in FIG. 2 and discussed in greater detail below.

In one example, event detection station 150 may obtain event notifications from one or more information feed sources 132, such as a weather alert service, a traffic alert service, a public safety alert service, an aggregator alert service, and so on. The event notifications may be in formats such as a SMS/text message-based alert, a RSS feed-based alert, an email-based alert, and so forth. The event notifications obtained by event detection station 150 may all be in a same format or may be in a plurality of different formats. In one example, the event detection station 150 may be subscribed to a feed service from one or more of the information feed sources 132. The event notifications from information feed sources 132 may be transmitted point-to-point, or may be broadcast or multicast. Although the example of FIG. 1 illustrates information feed sources 132 as connected to other networks 118, it should be noted that the information feed sources 132 may alternatively or additionally disseminate a frequency modulation (FM) or amplitude modulation (AM) radio broadcast alert, a television broadcast alert, a wireless emergency alert (WEA), and so forth.

As illustrated in FIG. 1, the media source 180 (e.g., camera 191 and microphone 194) may be directed at a roadway 145 and may capture a video or a sequence of images which may be relayed to event detection station 150. In the present example, the video stream may include imagery of a box 148 (e.g., debris) on the roadway 145. In addition, the video stream may include imagery of a crash between cars 140 and 142. Either or both of these incidents may be identified as anomalies in the video stream by event detection station 150. In addition, anomaly signatures may be created for either or both of these anomalies and labeled in accordance with an external data feed from one of information feed sources 132. For example, a text alert from one of information feed sources 132 may state: "accident on I-95 mile marker 82 reported at 11:15 am." In one example, the anomaly signature for the box 148 in the road 145 may be tagged as a possible causal event for the detected event of "accident."

In addition, in one example, either or both anomaly signatures may be deployed as filters by event detection station 150 to process future media content (e.g., video stream(s)) from media source 180, other media sources directed at roadway 145, and/or other media sources directed at other roadways. In particular, when a portion of a video stream is a match to one of the filters (i.e., to one of the anomaly signatures), a possible event may be notified to one or more monitoring devices 134 without awaiting a possible confirmatory notification from one of the information feed sources 132. In the present example, the notification may be sent in the form of an SMS/text message, an email, an RSS feed, etc. via access networks 114, telecommunication service provider network 110, other networks 118, and so forth. In one example, the notification may comprise an instruction to change a signal in an environment (e.g., a traffic signal 152 and/or traffic signal 154). For instance, the traffic signals 152 and 154 may be changed to blinking yellow lights to signal to other motorists that there may be an accident in the vicinity and to use caution.

In another example, event detection station 150 may gather images, video, and/or audio from media source 181 (e.g., camera 192 and microphone 195). For instance, media source 181 may be directed at building 125 (e.g., a home or a business), which may have an address of "123 Center Street." In one example, the media content may include the sound of breaking glass, imagery of an open or broken window 127, an open door 129, etc. In any case, the media content may be determined to include an anomaly when the media content differs from the normal or expected media content from the media source 181 relating to house 125. In addition, in one example, the event detection station 150 may obtain event notifications from one of the information feed sources 132, e.g., a police report data feed that may include a message: "vandalism at 123 Center Street reported 2:30 pm." In such an example, the event detection station 150 may determine that the location in the event report matches the location of media source 181. In addition, the event detection station 150 may determine that the time of the event notification matches a time for which an anomaly in the media content from media source 181 was detected. In such case, an anomaly signature may be created from the media content (i.e., from the time of the anomaly) and labeled as "vandalism."

The event detection station 150 may then deploy a filter comprising the anomaly signature to process additional media content from media source 181 and/or from other media sources. For instance, other media sources that may be deployed and directed at other buildings may feed media content to the event detection station 150 to determine if and when any patterns in such media content match the anomaly signature, and may therefore indicate a possible event of the event type "vandalism." In such case, a possible act of vandalism may be reported to one or more of monitoring devices 134 (e.g., a terminal at a police station, a terminal for a neighborhood security officer, etc.). Notably, such a notification may be obtained before any actual person may observe and report such an act of vandalism. Alternatively, or in addition, the event detection station 150 may present a notification in an audio format, e.g., a recording played via one or more speakers deployed in an environment, via one or more mobile phone speakers, etc. For instance, the event detection station 150 may cause a warning to be played out via a loudspeaker at or near building 125 to notify neighbors, to deter a possible perpetrator from additional acts, etc. In one example, the detection of a match to an anomaly signature may cause event detection station 150 to activate one or more additional devices, such as turning on an additional camera facing the building 125 from a different vantage point, turning on an additional camera that is outward facing from building 125, reorienting a camera, closing an automated door or a gate on the property of building 125, turning on a spotlight, and so forth.

In still another example event detection station 150 may gather images, video, and/or audio from media source 182 (e.g., camera 193 and microphone 196). For instance, media source 182 may be directed at a cell tower 120, which may include antenna arrays 121, a mast 122, and other components (not shown). In one example, the media content from media source 182 may include imagery of one of antenna arrays 121 being missing, one of antenna arrays 121 being out of a normal position, etc. For instance, over a significant time period, the event detection station 150 may obtain a series of images of cell tower 120 from media source 182. The images may all include the antenna arrays 121 in a particular configuration and having set positions. The event detection station may determine that there is an anomaly based upon one or more images that then show one or more of the antenna arrays 121 being out of a previous position.

In addition, in one example, the event detection station 150 may obtain event notifications from one of the information feed sources 132, e.g., a network repair/trouble ticket system. For instance, there may be a subsequent repair order that indicates: "antenna orientation problem, cell tower 120, Apr. 28." In such an example, the event detection station 150 may determine that the location in the event report (e.g., cell tower 120) matches the location of media source 182 (cell tower 120). In addition, the event detection station 150 may determine that the time of the event notification matches a time for which an anomaly in the media content from media source 182 is detected (e.g., during the same day, during a two day window, etc.). In such case, an anomaly signature may be created from the media content (i.e., from the time of the anomaly) and labeled as "antenna orientation problem."

The event detection station 150 may then deploy a filter comprising the anomaly signature to process additional media content from media source 182 and/or from other media sources. For instance, other media sources that may be deployed and directed at other cell towers may feed media content to event detection station 150. In addition, event detection station 150 may determine if and when any patterns in such media content match the anomaly signature, and may therefore indicate a possible event of the event type "antenna orientation problem." In such case, a possible antenna orientation problem may be reported to one or more of monitoring devices 134 (e.g., a network technician or supervisor, network operations personnel, etc.). Notably, such a notification may be obtained before any actual person may observe and report such an antenna orientation problem.

In one example, the detection of media content matching the anomaly signature may also cause event detection station 150 to activate and collect data from one or more sensors 156. For instance, sensors 156 may include a wind speed sensor which may provide useful data that the possible antenna orientation problem may involve high winds. In such an example, a notification to one of monitoring devices 134 may include corresponding wind speed measurements.

Alternatively, or in addition, sensors 156 may collect measurements continuously, but may only report the measurements in response to a request from event detection station 150. For instance, sensors 156 may collect and store 24 hours of measurements. Thus, when event detection station 150 determines that there is media content that matches an anomaly signature, the event detection station 150 may then request the sensor measurements from sensors 156 for the same time period during which the anomaly is detected.

It should be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, the operations described above with respect to event detection station 150 may alternatively or additionally be performed by a device, or a plurality of devices in telecommunication service provider network 110, access network 114, other networks 118, and so forth, such as servers 112. In one example, a first device may process media content to identify anomalies, a second device may correlate the anomalies to events identified in one or more external data feeds, a third device may create and update anomaly signatures based upon feedback, a fourth device may implement anomaly signatures as filters for real-time media content feeds, a fifth device may control the activation of sensors after detection of an anomaly, and so forth. In addition, although media sources 180-182 are illustrated in a wire-based networking deployment, in other, further, and different examples, any one or more of media sources 180-182 may alternatively or additionally be equipped for wireless communication. For example, media source 182 may capture media content relating to cell tower 120 in addition to transmitting the media content to other network-based devices via the same cell tower 120. Thus, these and other modifications are all contemplated within the scope of the present disclosure.

FIG. 2 illustrates a flowchart of an example method 200 for providing a notification of an anomaly in a media content that is associated with an event type. In one example, steps, functions and/or operations of the method 200 may be performed by event detection station 150, and/or server 112 of FIG. 1, or any one or more of such devices in conjunction with one another and/or with other components, such as one or more media sources 180-182, sensors 156, information feed sources 132, monitoring devices 134, and so forth. In one example, the steps, functions, or operations of method 200 may be performed by a computing device or processing system 300, and/or processor 302 as described in connection with FIG. 3 below. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system, e.g., comprising a control system, and/or control system in conjunction with other components. For illustrative purposes, the method 200 is described in greater detail below in connection with an example performed by a processor, such as processor 302. The method begins in step 205 and may proceed to optional step 210 or to step 215.

At step 210, the processor detects a first anomaly from a first media content. The first media content may comprise images, video, e.g., video sequences/clips, and/or audio, e.g., audio sequences/clips. In one example, the first media content comprises metadata including location information of the first media content and time information of the first anomaly. In one example, the detecting the first anomaly comprises detecting a plurality of anomalies having a threshold similarity from a plurality of media contents. For example, the plurality of anomalies may include the first anomaly, the plurality of media contents may include the first media content, and the first anomaly signature may be for the plurality of anomalies. For instance, the detecting of the plurality of anomalies having the threshold similarity may comprise applying a machine learning algorithm (MLA), such as a clustering algorithm, based upon a plurality of features from the plurality of media contents. The plurality of media contents may be from a same media source or a plurality of different media sources. In one example, the machine learning algorithm may comprise at least one of: a deep neural network (DNN), a generative adversarial network (GAN), or the like. In one example, the machine learning algorithm may further include an exponential smoothing algorithm, (e.g., Holt-Winters triple exponential smoothing) and/or a reinforcement learning algorithm. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on.

The plurality of features may include visual features, audio features, or both video and audio features. Visual features may include low-level invariant image data, changes with images and between images in a sequence (e.g., video frames or a sequence of still image shots), such as color histogram differences or a change in color distribution, a recognized object, a length to width ratio of an object, a velocity of an object estimated from a sequence of images (e.g., video frames), and so forth. Audio features may include low-level features such as: spectral centroid, spectral roll-off, signal energy, and so forth. Audio features may also include high level features, such as identified words and phrases. For instance, one example may utilize speech recognition pre-processing to obtain an audio transcript and to rely upon various keywords or phrases as data points. High-level audio features may also include identified noises of a particular source, e.g., a certain animal call, a plane, a helicopter, an automobile, etc.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 215, the processor generates a first anomaly signature for the first anomaly. In one example, the first anomaly signature may include those features which are determined to be the most distinguishing features of the anomaly, e.g., those features which are quantitatively the most different from what is considered statistically normal or average from a source of the media content, e.g., the top 20 features, the top 50 features, etc. In one example, the first anomaly signature is based upon a plurality of features from a plurality of anomalies (e.g., a plurality of anomalies that are clustered based upon feature similarities according to a machine learning algorithm).

At step 220, the processor obtains a notification of a first event. In one example, the notification comprises an event type of the first event, time information of the first event, and location information of the first event. The notification may be in a format such as a SMS/text message-based alert, a RSS feed-based alert, an email-based alert, a FM or an AM radio broadcast alert, a television broadcast alert, a wireless emergency alert (WEA), and so forth. The notification of the first event may be obtained from an external source, such as a weather alert service, a traffic alert service, a public safety alert service, and so forth, or an aggregator alert service providing multiple types of alerts.

At step 225, the processor correlates the first anomaly to the notification of the first event. For instance, the correlating may comprise determining a relevance of the notification of the first event to the first anomaly based upon a correspondence of a time and a location indicated in the notification of the first event with a time of the first anomaly and a location of the source of the media content. For instance, the location indicated for the notification may be relevant if it is determined to be within a threshold distance from the location of the media source, if it indicates a same mile marker or segment of a highway as the media source, if it indicates a same address, a same street, a same building, a same campus, etc. as the media source, and so forth. In one example, the processor accesses a database that may be used to determine the location of the media source. In one example, the time relevance may be determined in accordance with a lookback period for which the processor may inspect the media content for any detected anomalies. For instance the lookback period may comprise ten minutes prior to the time indicated in the notification, 15 minutes prior to the time indicated in the notification, 30 minutes prior to the time indicated in the notification, and so forth.

At step 230, the processor labels the first anomaly signature with the event type. For instance, the label may be stored as metadata along with the first anomaly signature.

At optional step 235, the processor may detect a third anomaly in the first media content that is later in time than the first anomaly and earlier in time than the time information of the first event that is indicated in the notification. In one example, optional step 235 may comprise similar operations to that which is described above in connection with step 210.

At optional step 240, the processor may generate a second anomaly signature for the third anomaly. In one example, optional step 240 may comprise similar operations to that which is described above in connection with step 215.

At optional step 245, the processor may correlate the third anomaly to the notification of the first event. In one example, optional step 245 may comprise similar operations to that which is described above in connection with step 220.

At optional step 250, the processor may identify the first anomaly as a cause of the third anomaly, when the first anomaly and the third anomaly are both correlated to the notification of the first event.

At optional step 255, the processor may label the second anomaly signature with the event type. For instance, the label may be stored as metadata along with the second anomaly signature.

At optional step 260, the processor may label the first anomaly signature as a potential cause signature of the event. For instance, if the event type is "car accident," it may be considered that the third anomaly (and the second anomaly signature) relate to the actual car accident captured in the media content, whereas the first anomaly may be an obstruction on the road, such as a box (e.g., debris) in the road, an animal on the road, etc. At optional step 260, the exact nature of the first anomaly may be unknown to the processor. However, the temporal relation of the first anomaly and the third anomaly may be considered as indicative of a possible causal relationship that may be recorded in a label added at optional step 260. Thus, the first anomaly signature can be deemed to be a potential cause signature of the event.

At step 265, the processor detects a second anomaly from a second media content that matches the first anomaly signature. For instance, the first anomaly signature may be deployed as a filter to process additional media content from the same or a different media source as the first media content. The filter may be deployed at a same device as the processor (e.g., the filter may comprise a process loaded in a memory and executed by the processor) and/or at one or more additional devices in a network. In an example where the filter is at a different device, the processor may receive a notification from the device operating the filter when there is a detection of the second anomaly.

At optional step 270, the processor may activate at least one sensor at a location associated with the location information of the second media content, when it is detected that the second anomaly matches the first anomaly signature. In addition, the processor may receive sensor data from the at least one sensor following the activation of the at least one sensor and the collection of the sensor data.

At step 275, the processor transmits a notification of a second event of the event type when it is detected that the second anomaly matches the first anomaly signature. In one example, the processor includes the event type, location information of the second media content, and time information of the second anomaly in the notification of the second event. In one example, the processor may further include a portion of the second media content containing the second anomaly in the notification of the second event, or a link (e.g., a URL) providing access to a stored copy of the portion of the second media content containing the second anomaly. In addition, in an example where sensor data is collected by at least one sensor activated at optional step 270, the notification of the second event may further comprise sensor data from the at least one sensor. For example, if an anomaly indicates a problem with one or more antennas of a cell tower, a wind speed sensor may collect useful data indicating high winds that may be included in the notification. For instance, a recipient of the notification may find it more credible that there is an actual problem when the notification indicates an event type of "problem with antenna orientation" and the wind speed sensor measurement indicates high winds, i.e., confirmation of a potential cause of the detected anomaly.

In one example, the notification of the second event may be transmitted to a monitoring device (e.g., a device of police, fire, EMS, or DOT personnel, a device of a homeowner, a building manager, security personnel, and so forth). In one example, the notification may be alternatively or additionally transmitted to an automated signaling device at a location of the media source of the second media content. For instance, the notification may comprise instructions or may otherwise cause the automated signaling device to display an alert. For instance, a roadway sign may change from a green light to a blinking yellow or red light to signal caution to motorists. In another example, the roadway sign may display text such as "possible accident ahead—use caution." In still another example, a speed limit may be reduced in an area near the incident. The notification of the first event may be transmitted in one or more formats such as a SMS-based alert, a RSS-based alert, an email-based alert, a radio broadcast alert, a television broadcast alert, and so forth.

At optional step 280, the processor may receive a feedback for the notification of the second event. The feedback may be a positive feedback or a negative feedback. For instance, a recipient of the notification of the second event may review a portion of the second media content and may conclude that the event label is accurate or that the event label is inaccurate, and provide feedback to the processor according to the conclusion reached. In another example, a person may be dispatched to the location of the media source providing the second media content, and may provide feedback regarding the accuracy of the event label. In still another example, there may be an additional notification of the second event that is obtained from an external source, such as a weather alert service, a traffic alert service, a public safety alert service, and so forth, or an aggregator alert service providing multiple types of alerts. For instance, there may be confirmation of an accident in a police report shortly following the notification of the second event transmitted at step 275 and possibly before a recipient is able to review the notification.

At optional step 285, the processor may update the first anomaly signature based upon features of the second anomaly. For example, the features of the second anomaly may comprise a positive training example for the first anomaly signature when the feedback is a positive feedback, and may comprise a negative training example for the first anomaly signature when the feedback is a negative feedback.

Following step 275, or any of the optional steps 280-285, the method 200 may proceed to step 295. At step 295, the method 200 ends.

It should be noted that the method 200 may be expanded to include additional steps or may be modified to include additional operations with respect to the steps outlined above. For example, the method 200 may be expanded to include repeating the steps 210-230 or steps 210-260 through multiple iterations, repeating steps 265-275 or steps 265-280 through multiple iterations, and so on. In another example, the method 200 may be expanded to include learning regular actions in response to an event of a particular event type, and then including a suggested course of action in the notification of a second event of the event type (e.g., suggesting the "typical" response that is learned over time). In another example, the method may be expanded to include automatically implementing one or more actions that are learned as a response pattern. For instance, if a recipient often activates a second camera in the vicinity of a camera from which the second media content is captured, the next time an event of the event type is detected, the processor may automatically capture media content from a nearby camera, may reorient a nearby camera, and so forth. In addition, the processor may also provide video from the nearby camera, e.g., in addition to the second media content. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Furthermore, the capturing and dissemination of any of the captured video and/or audio are only performed in full compliance with the pertinent privacy rules and policies that are in effect at the time. In other words, the captured video and/or audio of any individuals would only be done with the permission of the individuals (e.g., opting-into a service with full notice of the potential actions of capturing and dissemination of video and/or audio) or as permitted by law.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for providing a notification of an anomaly in a media content that is associated with an event type, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing a notification of an anomaly in a media content that is associated with an event type (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing a notification of an anomaly in a media content that is associated with an event type (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processing system including at least one processor, a first anomaly from a first media content;
   generating, by the processing system, a first anomaly signature for the first anomaly;
   obtaining, by the processing system, a notification of a first event, wherein the notification comprises an event type of the first event, time information of the first event, and location information of the first event;
   correlating, by the processing system, the first anomaly to the notification of the first event;
   labeling, by the processing system, the first anomaly signature with the event type;
   detecting, by the processing system, a second anomaly from a second media content that matches the first anomaly signature; and
   transmitting, by the processing system, a notification of a second event of the event type when it is detected that the second anomaly matches the first anomaly signature, wherein the notification of the second event comprises:
   the event type;
   location information of the second media content;
   time information of the second anomaly; and
   a portion of the second media content that includes the second anomaly.

2. The method of claim 1, wherein the first media content includes at least one of:
   images;
   video; or
   audio.

3. The method of claim 1, wherein the detecting the first anomaly comprises detecting a plurality of anomalies having a threshold similarity from a plurality of media contents, wherein the plurality of anomalies includes the first anomaly, wherein the plurality of media contents includes the first media content, and wherein the first anomaly signature is for the plurality of anomalies.

4. The method of claim 3, wherein the first anomaly signature is based upon a plurality of features from the plurality of anomalies.

5. The method of claim 4, wherein the plurality of features includes at least one of:
   visual features; or
   audio features.

6. The method of claim 3, wherein the detecting the plurality of anomalies having the threshold similarity comprises applying a machine learning algorithm based upon a plurality of features from the plurality of media contents.

7. The method of claim 6, wherein the machine learning algorithm comprises at least one of:
   a deep neural network;
   a generative adversarial network;
   an exponential smoothing algorithm; or
   a reinforcement learning algorithm.

8. The method of claim 1, wherein the first media content comprises metadata including:
   location information of the first media content; and
   time information of the first anomaly.

9. The method of claim 8, further comprising:
   detecting a third anomaly in the first media content that is later in time than the first anomaly and earlier in time than the time information of the first event;
   generating a second anomaly signature for the third anomaly;

correlating the third anomaly to the notification of the first event; and identifying the first anomaly as a cause of the third anomaly, when the first anomaly and the third anomaly are both correlated to the notification of the first event.

10. The method of claim 1, further comprising:

labeling the second anomaly signature with the event type; and labeling the first anomaly signature as a potential cause signature of the event type.

11. The method of claim 1, further comprising:

activating at least one sensor at a location associated with the location information of the second media content, when it is detected that the second anomaly matches the first anomaly signature, wherein the notification of the second event further comprises sensor data from the at least one sensor.

12. The method of claim 1, further comprising:

receiving a feedback for the notification of the second event comprising one of:

a positive feedback; or a negative feedback; and updating the first anomaly signature based upon features of the second anomaly.

13. The method of claim 12, wherein the features of the second anomaly comprise a positive training example for the first anomaly signature when the feedback is the positive feedback, and wherein the features of the second anomaly comprise a negative training example for the first anomaly signature when the feedback is the negative feedback.

14. The method of claim 1, wherein the notification of the second event is sent to at least one of:

a monitoring device; or an automated signaling device at a location associated with the location information of the second media content.

15. The method of claim 1, wherein the notification of the first event comprises:

a short message service-based alert;

a really simple syndication-based alert;

an email-based alert;

a radio broadcast alert; or a television broadcast alert.

16. The method of claim 1, wherein the notification of the first event is obtained from:

a weather alert service;

a traffic alert service;

a public safety alert service; or an aggregator alert service.

17. A non-transitory computer-readable medium storing instructions which, when executed by a processing system including at least one processor, cause the processing system to perform operations, the operations comprising:

detecting a first anomaly from a first media content;

generating a first anomaly signature for the first anomaly;

obtaining a notification of a first event, wherein the notification comprises an event type of the first event, time information of the first event, and location information of the first event;

correlating the first anomaly to the notification of the first event;

labeling the first anomaly signature with the event type;

detecting a second anomaly from a second media content that matches the first anomaly signature; and transmitting a notification of a second event of the event type when it is detected that the second anomaly matches the first anomaly signature, wherein the notification of the second event comprises:

the event type;

location information of the second media content;

time information of the second anomaly; and a portion of the second media content that includes the second anomaly.

18. A device comprising:

a processing system including at least one processor; and a computer-readable medium storing instructions which, when executed by the processing system, cause the processing system to perform operations, the operations comprising:

detecting a first anomaly from a first media content;

generating a first anomaly signature for the first anomaly;

obtaining a notification of a first event, wherein the notification comprises an event type of the first event, time information of the first event, and location information of the first event;

correlating the first anomaly to the notification of the first event;

labeling the first anomaly signature with the event type;

detecting a second anomaly from a second media content that matches the first anomaly signature; and transmitting a notification of a second event of the event type when it is detected that the second anomaly matches the first anomaly signature, wherein the notification of the second event comprises:

the event type;

location information of the second media content;

time information of the second anomaly; and a portion of the second media content that includes the second anomaly.

19. The device of claim 18, wherein the detecting the first anomaly comprises detecting a plurality of anomalies having a threshold similarity from a plurality of media contents, wherein the plurality of anomalies includes the first anomaly, wherein the plurality of media contents includes the first media content, and wherein the first anomaly signature is for the plurality of anomalies.

20. The device of claim 19, wherein the first anomaly signature is based upon a plurality of features from the plurality of anomalies.

* * * * *